(12) United States Patent
Mathis et al.

(10) Patent No.: US 10,533,614 B2
(45) Date of Patent: Jan. 14, 2020

(54) FLEXIBLE COUPLINGS FOR MECHANICAL POWER TRANSMISSIONS

(71) Applicant: Goodrich Corporation, Charlotte, NC (US)

(72) Inventors: Jeffrey Mathis, Rome, NY (US); Raghu Iyer, New Hartford, NY (US)

(73) Assignee: Goodrich Corporation, Charlotte, NC (US)

( * ) Notice: Subject to any disclaimer, the term of this patent is extended or adjusted under 35 U.S.C. 154(b) by 418 days.

(21) Appl. No.: 15/214,152

(22) Filed: Jul. 19, 2016

(65) Prior Publication Data
US 2018/0023631 A1 Jan. 25, 2018

(51) Int. Cl.
*F16D 3/72* (2006.01)
*F16D 3/06* (2006.01)

(52) U.S. Cl.
CPC ...... *F16D 3/72* (2013.01); *F16D 3/06* (2013.01)

(58) Field of Classification Search
CPC ..... F16D 3/72; F16D 3/79; F16D 3/06; F16D 3/78
USPC ............................................. 464/79, 80, 99
See application file for complete search history.

(56) References Cited

U.S. PATENT DOCUMENTS

| 4,133,188 A | 1/1979 | Cartwright |
| 4,779,820 A | 10/1988 | Lambert |
| 5,158,504 A | 10/1992 | Stocco |
| 6,200,223 B1 | 3/2001 | Martens |
| 7,707,703 B2 | 5/2010 | Gilbert |
| 7,896,748 B2 * | 3/2011 | Muskus ............... F16D 3/72 464/79 |
| 8,235,828 B2 | 8/2012 | Davies et al. |
| 8,591,345 B2 | 11/2013 | Stocco et al. |
| 2007/0049379 A1 * | 3/2007 | Faass ................ F16D 3/74 464/79 |

FOREIGN PATENT DOCUMENTS

| EP | 0026681 A1 | 4/1981 |
| EP | 2273143 A1 | 1/2011 |
| GB | 1091121 A | 11/1967 |
| GB | 2504064 A | 1/2014 |
| WO | WO-2015107321 A1 | 7/2015 |

OTHER PUBLICATIONS

European Search Report received from European Patent Office (EPO) dated Dec. 5, 2017 for Application No. EP17181283.7.

* cited by examiner

*Primary Examiner* — Greg Binda
(74) *Attorney, Agent, or Firm* — Locke Lord LLP; Scott D. Wofsy; Georgi Korobanov

(57) ABSTRACT

A flexible coupling includes a flexible diaphragm body having a first end and a second end. A member is fixed to the first end of the flexible diaphragm body. A splined member is fixed to the second end of the flexible diaphragm body. The splined member is configured to shift relative to a rotatable member rotatably fixed thereto in response to axial displacement of rotatable members interconnected by the flexible coupling. The ratio of inner diameter to the outer diameter is selected to allow for packaging the flexible coupling in a confined space.

11 Claims, 5 Drawing Sheets

FLEXIBLE COUPLINGS FOR MECHANICAL POWER TRANSMISSIONS

BACKGROUND OF THE INVENTION

1. Field of the Invention

The present disclosure relates to mechanical power transmissions, and more particularly to flexible couplings for mechanical power transmission systems.

2. Description of Related Art

Mechanical power transmissions such as in aircraft commonly employ interconnected driving and driven shafts to actuate devices such as wing-mounted slats and slats for controlling flight. Because there can be angular misalignment and/or axial offsets between interconnected driving and driven shafts, some transmissions employ flexible couplings to accommodate angular misalignment and axial offset between the driving and driven shafts. Examples of such flexible couplings include universal joints, gear couplings, and disk couplings.

Universal joints can accommodate large ranges of angular misalignment, but generally have limited capability to accommodate axial mismatch. Gear couplings can accommodate large ranges of axial mismatch, but typically have limited capability to accommodate angular misalignment. Universal joints and gear couplings generally employ contacting surfaces that require lubrication and are typically considered to be wear parts, requiring periodic replacement in some applications. Disk couplings, while not requiring lubrication, are generally able to tolerate relatively lesser amounts of angular misalignment and axial mismatch between driving and driven shafts.

Such conventional methods and systems have generally been considered satisfactory for their intended purpose. However, there is still a need in the art for improved flexible couplings. The present disclosure provides a solution for this need.

SUMMARY OF THE INVENTION

A flexible coupling includes a flexible diaphragm body having a first end and a second end. A member is fixed to the first end of the flexible diaphragm body. A splined member is fixed to the second end of the flexible diaphragm body. The splined member is configured to shift relative to a rotatable member rotatably fixed thereto in response to axial displacement of rotatable members interconnected by the flexible coupling.

In certain embodiments, the member can have a flange. The splined member can have a spline. The splined member can have a flange extending about the splined member. The flange can be disposed between the spline structure and the flexible diaphragm body. The flexible diaphragm body can have two or more diaphragm disks axially spaced between the member and the splined member. Axially adjacent diaphragm disks of the flexible diaphragm body can be fixed to one another at their outer peripheries. Axially adjacent diaphragm disks of the flexible diaphragm body can be fixed to one another at their inner peripheries.

In accordance with certain embodiments, the flexible coupling can be frictionless. The flexible coupling can have an open through-bore extending continuously between opposed ends of the flexible diaphragm body. The open through-bore can extend continuously between opposite ends of the flexible diaphragm body and the member. The open through-bore can extend continuously between opposite ends of the flexible diaphragm body and the splined member. The open through-bore can extend continuously between opposite ends of the splined member and the member.

It is also contemplated that, in accordance with certain embodiments, the flexible diaphragm body can have an inner diameter that is greater than an outer diameter of the splined member. The flexible diaphragm body can have an inner diameter that is greater than an inner diameter of the splined member. The flexible diaphragm body can have inner diameter that is greater than an inner diameter of the member. The flexible diaphragm body can have an outer diameter that is less than about four and half times an inner diameter of the flexible diaphragm body.

A mechanical power transmission for a flight control surface actuator includes a flexible coupling as described above. A first rotatable member is fixed axially and is fixed in rotation relative to the member. A second rotatable member is fixed in rotation and axially free relative to the splined member. The splined member can be movable between a first axial offset and a second axial offset relative to the second rotatable member, the second axial offset being greater than the first axial offset to reduce equivalent cyclic stress in the flexible diaphragm body. In certain embodiments, a flight control surface can operably connected to the flexible coupling by one of the first and second rotatable members. In accordance with certain embodiments, a source of mechanical rotation can be connected to flexible coupling by one of the first and second rotatable members.

A method transmitting torque through a flexible coupling includes applying axial force to a flexible coupling by axially displacing rotatable members interconnected by the flexible coupling. The axial force is reducing by axially shifting an end of the flexible coupling relative to one of the interconnected rotatable members. Equivalent cyclic stress in the flexible diaphragm body can also be reduced by axially shifting the end of the flexible coupling relative to the one of the interconnected rotatable members.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
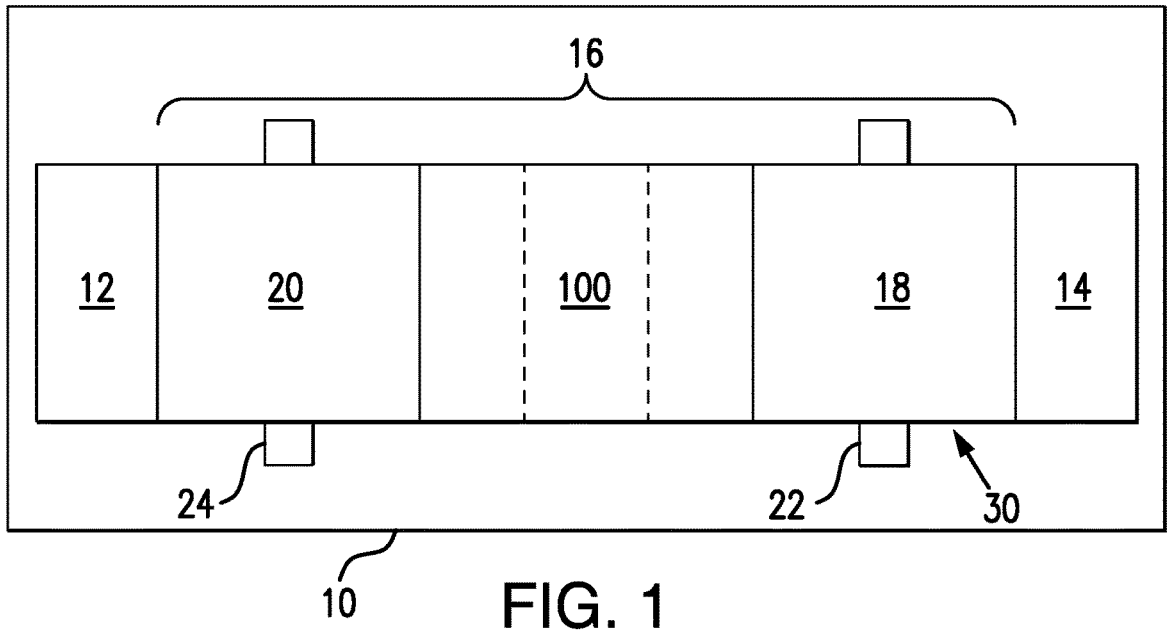
FIG. 1 is a schematic view of an exemplary embodiment of a mechanical power transmission constructed in accordance with the present disclosure, showing flight control device operably connected to a source of mechanical rotation by a flexible coupling.

Reference will now be made to the drawings wherein like reference numerals identify similar structural features or aspects of the subject disclosure. For purposes of explanation and illustration, and not limitation, a partial view of an exemplary embodiment of a flexible coupling in accordance with the disclosure is shown in FIG. 1 and is designated generally by reference character 100. Other embodiments of flexible couplings, mechanical power transmissions, and methods of communicating torque through flexible couplings in accordance with the present disclosure, or aspects thereof, are provided in FIGS. 2-6, as will be described. The systems and methods described herein can be used for actuating flight control surfaces in aircraft, though the present disclosure is not limited to flight control surface actuation or to aircraft in general.

Referring to FIG. 1, an aircraft 10 is shown. Aircraft 10 includes a flight control surface 12 operably connected to a source of mechanical rotation 14 by a mechanical power transmission 16. Flight control device 12 includes, by way of non-limiting example, a slat or a flap flight control surface for controlling attitude of aircraft 10 during flight. Source of mechanical rotation 14 includes, by way of non-limiting example, an electric motor or a power-take-off shaft, and is remotely connected to mechanical power transmission 16.

Mechanical power transmission 16 includes a first rotatable member 18, a second rotatable member 20, and flexible coupling 100. Mechanical power transmission 16 is rotatably supported relative to aircraft 10 by a first bearing structure 22 and a second bearing structure 24. First rotatable member 18 and second rotatable member 20 are interconnected by flexible coupling 100, first rotatable member 18 being and rotatably supported within first bearing structure 22 and second rotatable member 20 being and rotatably supported within second bearing structure 24.

Figure 2:
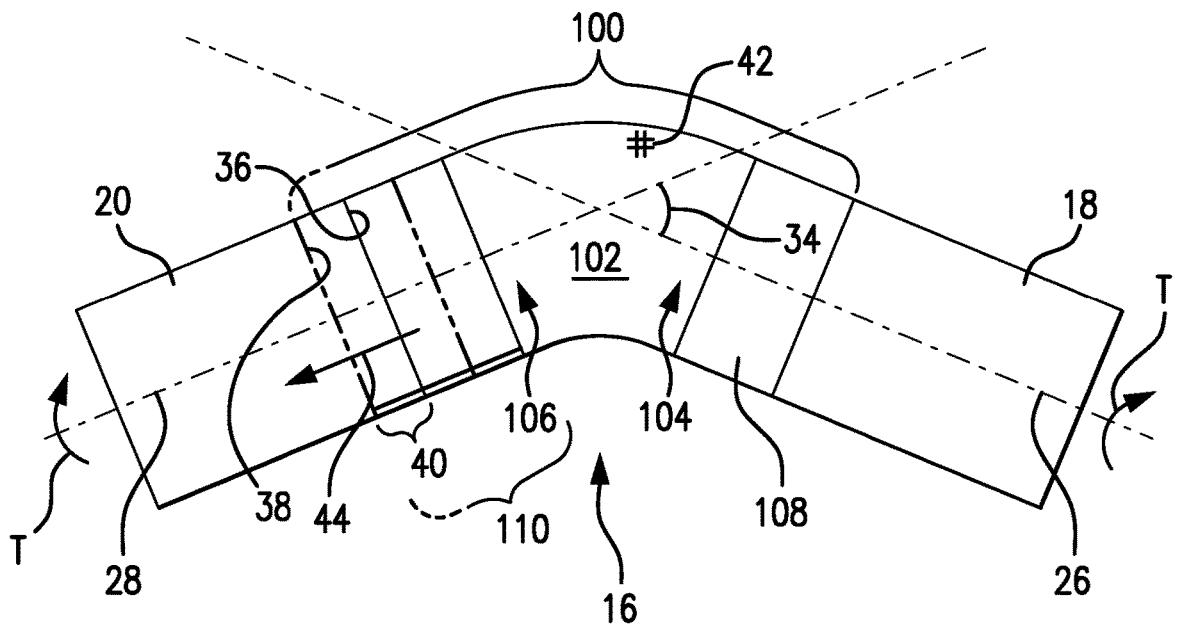
FIG. 2 is schematic view of the mechanical power transmission of FIG. 1, showing the flexible coupling communicating torque while accommodating angular misalignment and axial offset between rotatable members interconnected by the flexible coupling.

With reference to FIGS. 2, flexible coupling 100 of mechanical power transmission 16 is shown. Flexible coupling 100 includes a flexible diaphragm body 102 having a first end 104 and a second end 106, a member 108, and a splined member 110. Member 108 is fixed to first end 104 of flexible diaphragm body 102. Splined member 110 is fixed to second end 106 of flexible diaphragm body 102. Splined member 110 is configured to axially shift between a first axial offset 36 and a second axial offset 38 relative to second rotatable member 20 in response to axial displacement of first rotatable member 18 and/or second rotatable member 20, which are interconnected by flexible coupling 100.

First rotatable member 18 defines a first rotation axis 26 and is fixed both rotatably and axially relative to member 108. Second rotatable member 20 defines a second rotation axis 28, is rotatably fixed relative to splined member 110, and is axially free relative to splined member 110. First rotation axis 26 is angled relative to second rotation axis 28, thereby defining an angular misalignment 34 between first rotatable member 18 and second rotatably member 20. Second rotatable member 20 is axially offset relative to first rotatable member by a first axial offset 36, which may be a nominal axial offset between the elements.

Because both first rotatable member 18 and second rotatable member 20 are rotatably fixed to flexible coupling 100, torque T applied to either of first rotatable member 18 and second rotatable member 20 is communicated through flexible coupling 100 to the other of first rotatable member 18 and second rotatable member 20. Flexible diaphragm body 102 is configured to accommodate one or more torque T, angular misalignment 34, and/or a range of axial offsets defined between first axial offset 36 and second axial offset 38 by deformation, shown schematically in FIG. 2 with bowing of flexible diaphragm body 102. One or more of torque T, angular misalignment 34, and the a range of axial offsets defined between first axial offset 36 and second axial offset 38 generate equivalent a cyclic stress 42. Equivalent cyclic stress 42 is born by flexible diaphragm body 102 and is kept below the endurance strength of the material forming flexible diaphragm body 102, in part, by the axial width selected for flexible diaphragm body 102.

As will be appreciated by those of skill in the art in view of the present disclosure, vehicles such as aircraft 10 are commonly subject to factors such as flights loads, thermal effects, and/or variation in the amount of torque communicated between interconnected rotatable members. With respect to mechanical power transmission 16, one or more these exemplary factors exert a force 30 (shown in FIG. 1) on mechanical power transmission 16. Force 30 in turn exerts an axial force component 44 along mechanical power transmission 16, axial force component 44 being sufficient to axially displace mechanical power transmission 16, or elements thereof, axially. Axial displacement of mechanical power transmission 16, or elements thereof, exerts axial force component 44 on flexible coupling 100, increasing the level equivalent cyclic stress 42 born by flexible diaphragm body 102 for a given axial width of flexible diaphragm body 102.

As will also be appreciated by those of skill in the art in view of the present disclosure, the force born by flexible couplings generally influences the axial width of the flexible coupling structure, larger forces typically requiring larger axial widths. In applications such as flight control actuation mechanical drive systems, where space can be limited, there may be insufficient space for the outside widths (or additional axially stacked diaphragm disks) necessary to bear the cyclic equivalent stress with such applications, excluding the use of diaphragm disc couplings.

In embodiments described herein, splined member 110 is configured to axially shift relative to second rotatable member 20. In this respect splined member 110 is configured to axially shift between first axial offset 36 and second axial offset 38 when axial force component 44 exceeds a predetermined threshold force level. Axially shifting between first axial offset 36 and second axial offset 38, or axial takeup events reduces axial force component 44 and reduces commensurately the equivalent cyclic stress 42 born by flexible diaphragm body 102. Reducing the equivalent cyclic stress 42 born by flexible diaphragm body 102 reduces the axial width of flexible diaphragm body 102, e.g., diameter D (shown in FIG. 4). The reduction in the axial width can be such that flexible diaphragm body 102 can be arranged within the limited space of an aircraft wing or similarly restrictive structure, enabling use of flexible coupling 100 in such applications. In embodiments, flexible diaphragm body 102 may have an outside diameter that is between about two (2) and about five (5) inches. This enables flexible coupling 100 to be packaged within the confines of an aircraft wing structure. In certain embodiments outer diameter D of flexible diaphragm 102 is about three (3) inches.

Figure 3:
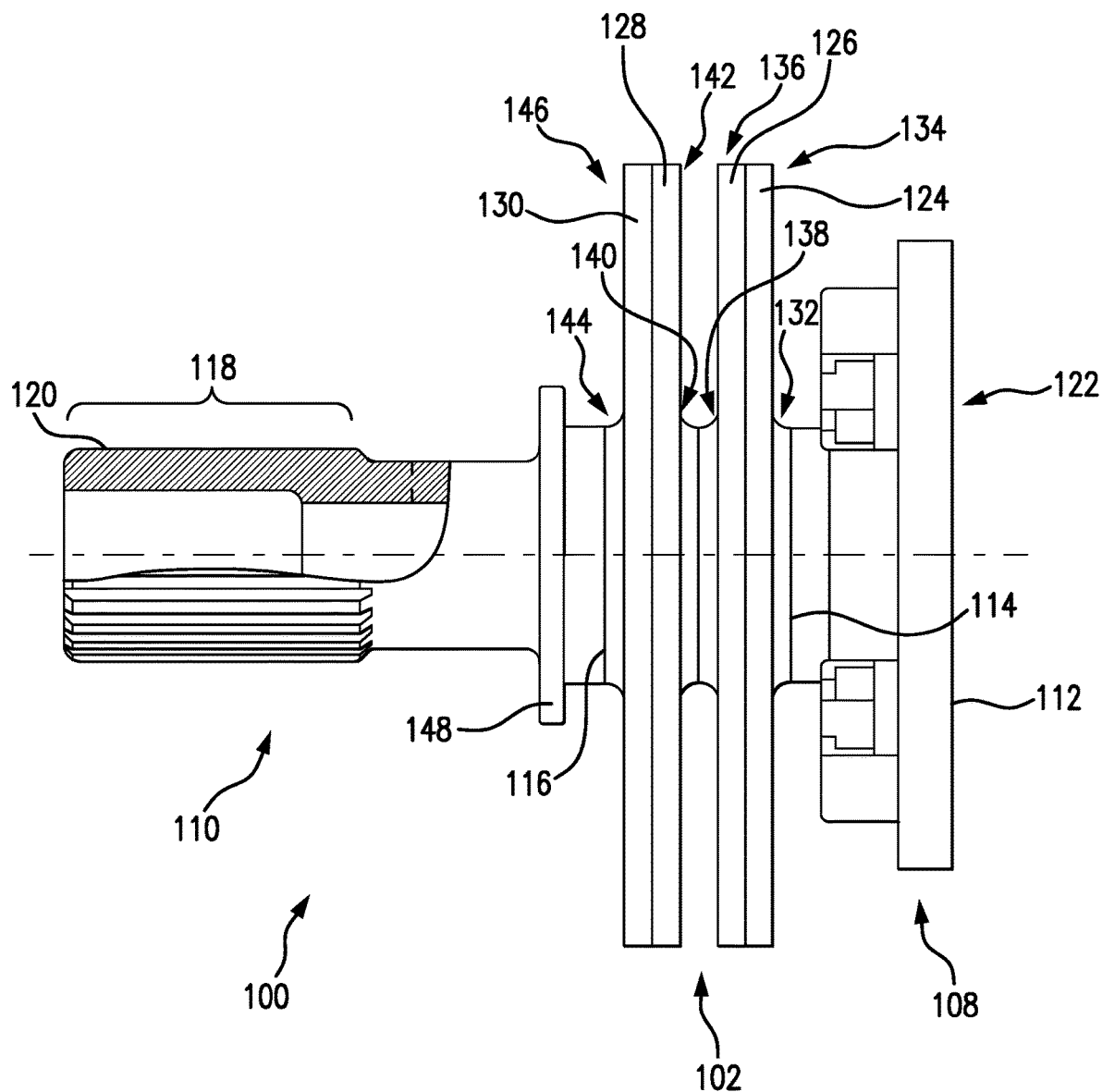
FIG. 3 is a side elevation view of the flexible coupling of FIG. 1, showing a splined member and a flanged member of the flexible coupling fixed to opposed first and second ends of a flexible diaphragm body.

With reference to FIG. 3, flexible coupling 100 is shown. Member 108 has a flange 122 disposed on an end of member 108 opposite flexible diaphragm body 102. Flange 122 is configured to connect first rotatable member 18 (shown in FIG. 2) to flexible coupling 100. Flange 122 may include a fastener pattern 112 for fixing member 108 both axially and in rotation relative to first rotatable member 18. A first fused joint 114 is disposed on an end of member 108 axially opposite flange 122. First fused joint 114 fixes member 108 to flexible diaphragm body 102 and can include a weld or a plurality of interfused layers formed with an additive manufacturing technique.

Splined member 110 includes a plurality of longitudinal spline structures 120 defined on an end 118 of splined member 110 opposite flexible diaphragm body 102. Spline structures 120 are configured to retain splined member 110 in an axially free disposition relative to second rotatable member 20 (shown in FIG. 2). A flange 148 extends about splined member 110, flange 148 being axially spaced between spline structures 120 and flexible diaphragm body 102. Flange 148 comprises a store of sacrificial material for dynamically balancing flexible coupling 100. Flange 148 may also form an axial stop, flange 148 restricting axial shift of splined member 110 relative to second rotatable member 20. A second fused joint 116 is disposed on an end of member 108 axially opposite flange 122. Second fused joint 116 is similar to first fused joint 114, and additionally fixes splined member 110 to flexible diaphragm body 102.

Flexible diaphragm body 102 includes a first diaphragm disk 124, a second diaphragm disk 126, a third diaphragm disk 128, and a fourth diaphragm disk 130 axially stacked between member 108 and splined member 110. First diaphragm disk 124 has a radially inner periphery 132 and a radially outer periphery 134. Second diaphragm disk 126 has a radially inner periphery 138 and a radially outer periphery 136. Third diaphragm disk 128 has a radially inner periphery 140 and a radially outer periphery 142. Fourth diaphragm disk 130 has a radially inner periphery 144 and a radially outer periphery 146.

First diaphragm disk 124 is axially adjacent to second diaphragm disk 126. First diaphragm disk 124 is connected to member 108 at its radially inner periphery 132. Radially outer periphery 134 of first diaphragm disk 124 is in turn connected to radially outer periphery 136 of second diaphragm disk 126.

Second diaphragm disk 126 is axially adjacent to third diaphragm disk 128. Inner periphery 138 of second diaphragm disk 126 is connected to radially inner periphery 140 of third diaphragm disk 128. Third diaphragm disk 128 is axially stacked between second diaphragm disk 126 and fourth diaphragm disk 130, radially outer periphery 142 of third diaphragm disk 128 being connected to radially outer periphery 146 of fourth diaphragm disk 130. Radially inner periphery 144 of fourth diaphragm disk 130 is in turn connected to splined member 110. Although illustrated as having four diaphragm members, it is to be understood and appreciated that embodiments of flexible coupling described herein can have fewer than four diaphragm disks or more than four diaphragm disks, as suitable for an intended application.

Figure 4:
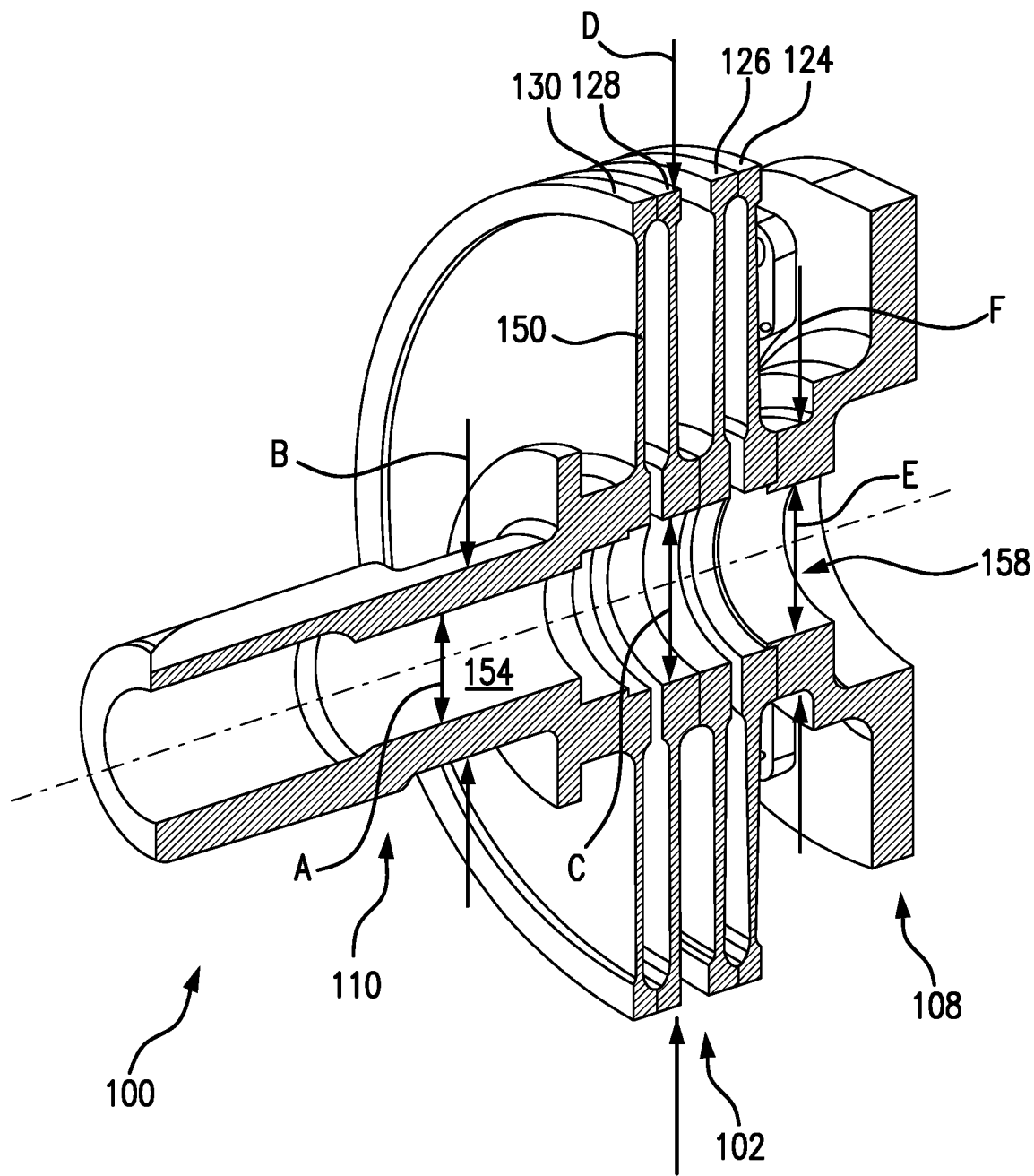
FIG. 4 is a cross-section view of the flexible coupling of FIG. 1, showing a through-bore extending continuously through an interior of the flexible coupling.

With reference to FIG. 4, flexible coupling 100 is shown. Flexible coupling 100 has an interior 158 defining an open through-bore 154. Open through-bore 154 extends continuously between first end 104 (shown in FIG. 2) and second end 106 (shown in FIG. 2) of flexible diaphragm body 102, and is empty. In this respect flexible diaphragm body 102 is axially unlimited, deformation and shift being dictated by elements external to flexible coupling 100.

It is contemplated that open through-bore 154 extend continuously between second 106 of the flexible diaphragm body 102 and an end of member 108 opposite flexible diaphragm body 102. In certain embodiments open through-bore 154 extends continuously between first end 104 of flexible diaphragm body 102 and an end of splined member 110 opposite flexible diaphragm body 102. In the illustrated exemplary embodiment, open through-bore 154 extends continuously between axially opposite ends of flexible coupling 100, i.e. between ends of member 108 and splined member 110 disposed on axially opposite sides of flexible diaphragm body 102. In this respect the illustrated exemplary embodiment of flexible coupling 100 is frictionless, there being no sliding surfaces disposed within open through-bore 154. This reduces wear within flexible coupling 100, potentially extending the service life of flexible coupling 100.

Splined member 110 has an inner diameter A and an outer diameter B. Flexible diaphragm body 102 has an inner diameter C and outer diameter D. Member 108 has an inner diameter E and an outer diameter F. Outer diameter D of flexible diaphragm body 102 is less than about 4.7 times inner diameter C, and in certain embodiments outer diameter D of flexible diaphragm body 102 is less than about 4.5 times inner diameter C. Sizing outer diameter D such that outer diameter D is less than about 4.7 times inner diameter C enables flexible coupling 100 to transfer sufficient torque for a flight control actuation system and bear equivalent cyclic stress 42, as supplemented by axial force component 44 from axial displacement of rotatable members of the flight control actuation system—within the confines of an aircraft wing.

In the illustrated exemplary embodiment, inner diameter C of flexible diaphragm body 102 is greater than inner diameter A of splined member 110. Optionally, inner diameter C of flexible diaphragm body 102 is also greater than inner diameter E of member 108, thereby providing a piloting structure to facilitate assembly of flexible coupling 100. Sizing the respective inner and outer diameters of flexible coupling 100 also allows for outer diameter D of flexible diaphragm body 102 to be relatively small, allowing flexible coupling 100 to be arranged within the confines of an aircraft wing structure.

The plurality of diaphragm disks, e.g., a first diaphragm disk 124, a second diaphragm disk 126, a third diaphragm disk 128, and fourth diaphragm disk 130, define respective tapered profiles 150. Tapered profiles 150 extend between respective inner peripheries and outer peripheries of diaphragm disks 124-130. It is contemplated that tapered profiles 150 are as described in U.S. Pat. No. 8,591,345 to Stocco et al. (Stocco), issued on Nov. 26, 2013, the contents of which is incorporated herein by reference. In certain embodiments, tapered profiles are similar to those described with Stocco, with the difference that the ratio of outer diameter D to inner diameter C is reduced.

Figure 5:
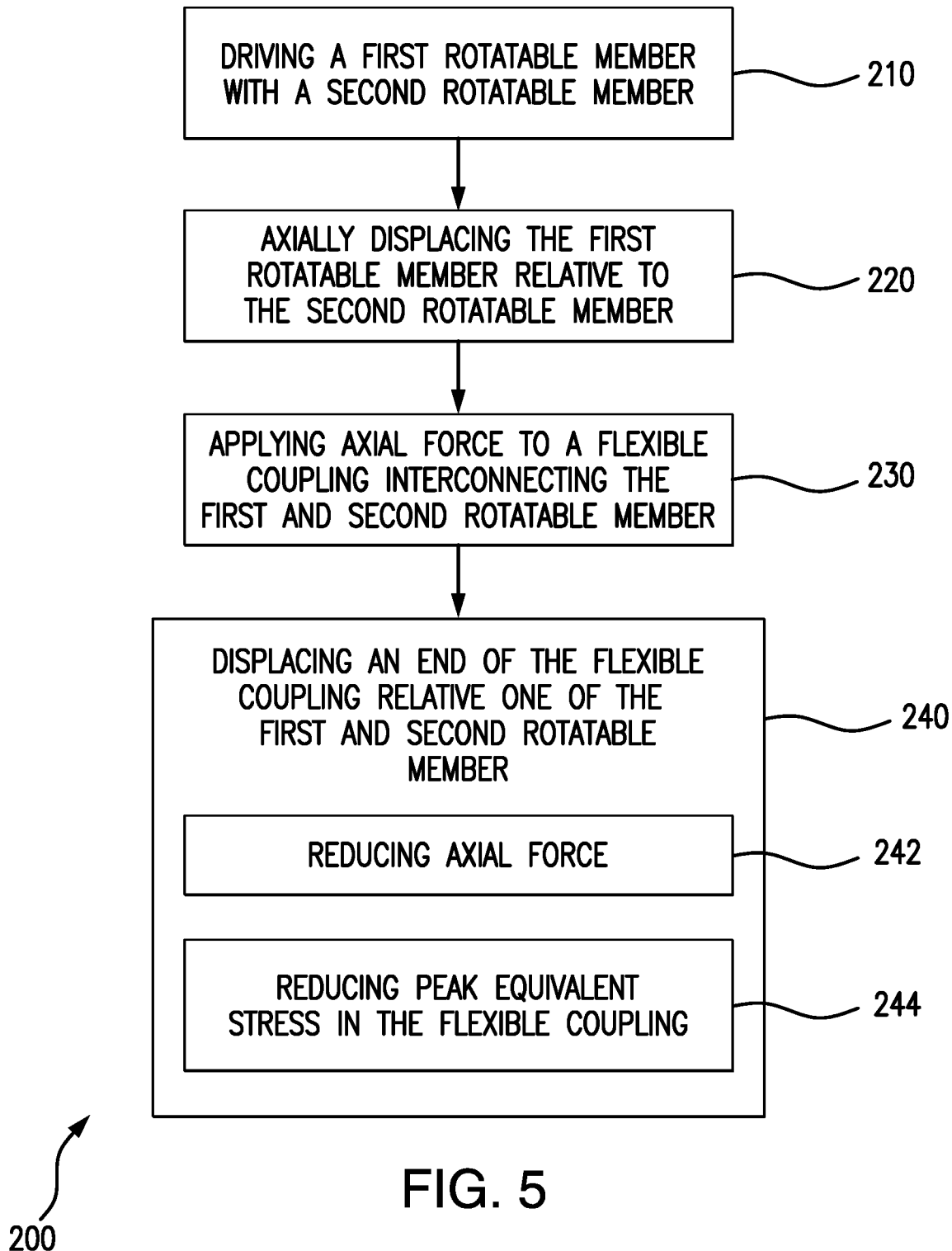
FIG. 5 is a diagram of a method of communicating torque through a mechanical power transmission, showing steps of the method.

With reference to FIG. 5, a method 200 of transmitting torque through a mechanical power transmission is shown, e.g., mechanical power transmission 16 (shown in FIG. 1). Method 200 includes driving a first rotatable member, e.g., first rotatable member 18 (shown in FIG. 1), with a second rotatable member, e.g., second rotatable member 20 (shown in FIG. 1), as shown with box 210. Method 200 also includes axially displacing one or more components of the mechanical power transmission, as shown with box 220. The axial displacement exerts an axial force, e.g., axial force component 44 (shown in FIG. 2), on a flexible coupling, e.g., flexible coupling 100 (shown in FIG. 1) interconnecting the rotatable members, as shown with box 230. Responsive to the axial force, an end of the flexible coupling, e.g., splined end 108 (shown in FIG. 2), is displaced relative to a rotatable member connected thereto, as shown in box 240. The axial displacement reduces the axial force component exerted on the flexible coupling, as shown with box 242. The axial displacement also reduced the equivalent cyclic stress, e.g., equivalent cyclic stress 42 (shown in FIG. 2), born by the flexible coupling, as shown with box 244.

Figure 6A:
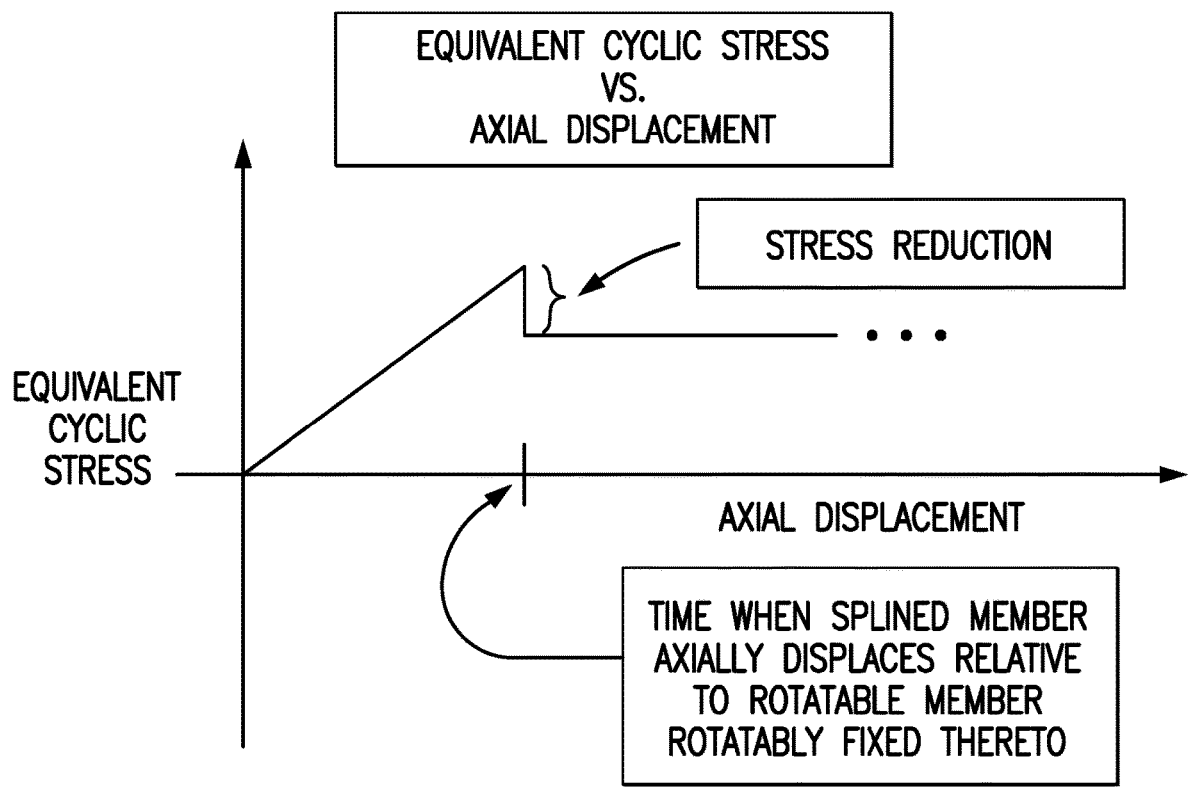
FIGS. 6A and 6B are charts of equivalent cyclic stress and axial force as functions of axial displacement, showing reduction in the axial force and equivalent cyclic stress with axial shift of an end of the flexible relative to a rotatable member rotatably fixed to the end, respectively.
Figure 6B:
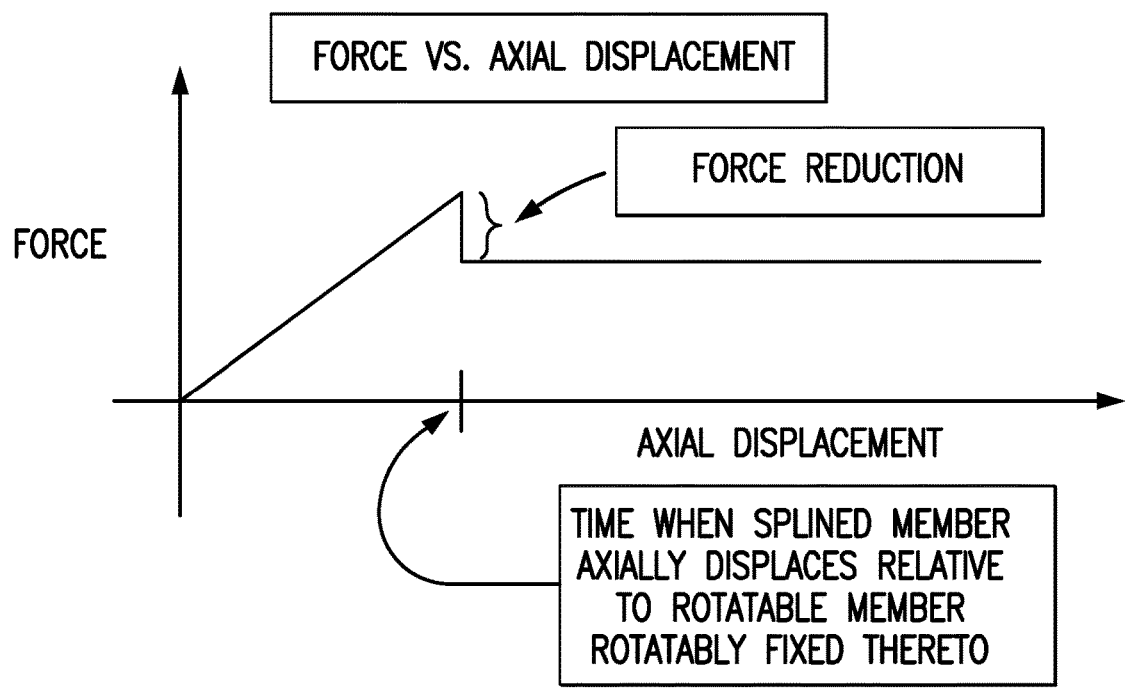

With reference to FIGS. 6A and 6B, the corresponding increase is equivalent cyclic stress 42 (shown in FIG. 2) born by flexible diaphragm body 102 is offset by axial shift 40. This reduces the axial force component 44 (shown in FIG. 2) and equivalent cyclic stress 42 born by flexible diaphragm body 102 prior to equivalent cyclic stress 42 exceeding the endurance strength of the material from which flexible diaphragm body 102 is constructed. Reduction in equivalent cyclic stress 42 associated with axial shift 40 is shown in FIG. 6A. Reduction in force 44 associated with axial shift 40 is shown in FIG. 6B.

The methods and systems of the present disclosure, as described above and shown in the drawings, provide for flexible couplings with superior properties including a self-limiting stress relief mechanism and a radially compact arrangement. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flexible coupling, comprising:
   a flexible diaphragm body having a first end and a second end;
   a member fixed to the first end of the flexible diaphragm body; and
   a splined member fixed to the second end of the flexible diaphragm body, wherein the splined member is configured to axially shift relative to a first rotatable member rotatably fixed to the splined member in response to axial displacement of the first rotatable member relative to a second rotatable member interconnected to the first rotatable member by the flexible coupling while transmitting torque between the first rotatable member and the second rotatable member, wherein the flexible diaphragm body comprises a plurality of diaphragm disks spaced between the member and the splined member, a first of the plurality of diaphragm disks and a second of the plurality of diaphragm disks fixed to one another at their inner peripheries, wherein the flexible diaphragm body has an inner diameter that is greater than an inner diameter of the splined member.

2. The flexible coupling as recited in claim 1, wherein the member comprises a flange.

3. The flexible coupling as recited in claim 1, wherein the flexible coupling has an open through-bore extending continuously between opposed ends of the flexible diaphragm body.

4. The flexible coupling as recited in claim 1, wherein the flexible coupling has an open through-bore extending continuously between opposite ends of the flexible diaphragm body and the member.

5. The flexible coupling as recited in claim 1, wherein the flexible coupling has an open through-bore extending continuously between opposite ends of the flexible diaphragm body and the splined member.

6. The flexible coupling as recited in claim 1, wherein the flexible coupling has an open through-bore extending continuously between opposite ends of the splined member and the member.

7. The flexible coupling as recited in claim 1, wherein the splined member defines a flange extending thereabout and arranged axially between a spline structure of the splined member and the flexible diaphragm body.

8. The flexible coupling as recited in claim 1, wherein the flexible coupling is frictionless.

9. The flexible coupling as recited in claim 1, wherein the flexible diaphragm body comprises a second plurality of diaphragm disks spaced between the member and the splined member, a first of the second plurality of diaphragm disks and a second of the second plurality of diaphragm disks being fixed to one another at their outer peripheries.

10. A flexible coupling comprising:
    a flexible diaphragm body having a first end and a second end;
    a member fixed to the first end of the flexible diaphragm body; and
    a splined member fixed to the second end of the flexible diaphragm body, wherein the splined member is configured to axially shift relative to a first rotatable member rotatably fixed to the splined member in response to axial displacement of the first rotatable member relative to a second rotatable member interconnected to the first rotatable member by the flexible coupling while transmitting torque between the first rotatable member and the second rotatable member, wherein the flexible diaphragm body comprises a plurality of diaphragm disks spaced between the member and the splined member, a first of the plurality of diaphragm disks and a second of the plurality of diaphragm disks fixed to one another at their inner peripheries, wherein the flexible diaphragm body has an inner diameter that is greater than an inner diameter of the member.

11. A flexible coupling as comprising:
    a flexible diaphragm body having a first end and a second end;
    a member fixed to the first end of the flexible diaphragm body; and
    a splined member fixed to the second end of the flexible diaphragm body, wherein the splined member is configured to axially shift relative to a first rotatable member rotatably fixed to the splined member in response to axial displacement of the first rotatable member relative to a second rotatable member interconnected to the first rotatable member by the flexible coupling while transmitting torque between the first rotatable member and the second rotatable member, wherein the flexible diaphragm body comprises a plurality of diaphragm disks spaced between the member and the splined member, a first of the plurality of diaphragm disks and a second of the plurality of diaphragm disks fixed to one another at their inner peripheries, wherein the flexible diaphragm body has an outer diameter and an inner diameter, the outer diameter being less than about 4.5 times the inner diameter.

\* \* \* \* \*